United States Patent
Hilgers

[15] 3,690,133
[45] Sept. 12, 1972

[54] METHOD OF CONTROLLING A MACHINE TOOL OPERATED AT DIFFERENT WORKING SPEEDS AND CONTROL SYSTEM FOR PERFORMING THE SAME

[72] Inventor: Arnold Hilgers, Eschweiler, Germany

[73] Assignee: Schumag Schumacher Metallwerke G.m.b.H., Aachen, Germany

[22] Filed: June 17, 1970

[21] Appl. No.: 46,995

[30] Foreign Application Priority Data
June 18, 1969 Germany..........P 19 30 700.7

[52] U.S. Cl.............................72/19, 72/24, 72/290
[51] Int. Cl..................................................B21c 1/30
[58] Field of Search..........72/287, 290, 291, 284, 28, 72/29, 21, 22, 23, 19; 318/571

[56] References Cited

UNITED STATES PATENTS

| | | | |
|---|---|---|---|
| 3,015,806 | 1/1962 | Wang et al.................. | 318/571 |
| 3,267,344 | 8/1966 | McDaniel..................... | 318/571 |
| 3,278,817 | 10/1966 | Johnson et al.............. | 318/571 |
| 3,138,243 | 6/1964 | Oakley......................... | 72/290 |
| 3,446,099 | 5/1969 | Lesher et al................ | 318/571 |

*Primary Examiner*—Richard J. Herbst
*Attorney*—Curt M. Avery, Arthur E. Wilfond, Herbert L. Lerner and Daniel J. Tick

[57] ABSTRACT

Method of controlling a machine tool operating at different working speeds includes triggering, by a fixed time interval, that is the same at all working speeds and is a characteristic of the machine too, the start of an operating cycle of the machine tool each time a moving element of the machine tool reaches a given starting position that is the same at all working speeds; the triggering being preceded and controlled by an activating switching step each time the element reaches a given activating position spaced at a constant distance from the starting position thereof and selected so that the total time required by the element to traverse the constant distance from the activating to the starting position is not shorter, even at maximum working speed of the machine tool, than the fixed time interval; and interposing between the activating and triggering steps, when the total time exceeds the fixed time interval at a particular working speed, an additional time interval depending upon the particular working speed and equal to the difference between the total time and the fixed time interval; and control system for performing the method.

23 Claims, 4 Drawing Figures

PATENTED SEP 12 1972

METHOD OF CONTROLLING A MACHINE TOOL OPERATED AT DIFFERENT WORKING SPEEDS AND CONTROL SYSTEM FOR PERFORMING THE SAME

My invention relates to method of controlling a machine tool operated at different working speeds, particularly a draw machine of the reciprocating carriage type, which starts an operating cycle each time a moving machine element reaches a particular starting position which is the same at all working speeds, the operating cycle having been triggered at an instant preceding the start of the cycle by a fixed time interval (machine time constant) that is the same at all working speeds and a characteristic of the machine. My invention also relates to a control system for performing the foregoing method.

A heretofore known method of initiating an operation is effected by a synchronously revolving cam. Since the machine element traverses varying distances that depend upon the different working speeds during the constant time lapse between the instants of initiating and attaining the starting position, this cam must be adjusted to the particular working speed used. It has already been proposed that several differently set cams be provided each of which being associated with a different working speed.

However, both of these types of operation are complicated, are awkward to perform and involve frequent stoppages. More particularly, they do not permit continuous change of the working speed.

It is therefore an object of the present invention to provide the afore-described method and control system for performing the same, whereby control can be effected without stoppage of the machine, readjustment of cams or the provision of multiple cams, even when the working speeds are continuously varied.

With the foregoing and other objects in view, I provide in accordance with my invention, method of control which comprises performing an activating switching operation, which controls the triggering of the operating cycle, each time the moving machine element reaches a particular position which is chosen so that the total time that depends upon the speed and that the moving machine element needs to traverse the constant distance from the activating to the starting position, is not shorter, even at the maximum feasible working speed, than the fixed time interval and, whenever at any other working speed this total time exceeds the fixed time interval, interposing an additional time interval that depends upon this working speed and that is equal to this difference.

Contrary to conventional methods, the method of my invention does not therefore rely upon a variation of the total distances traversed. The total distance in my proposed method always remains the same, but at different working speeds, the total time intervals that elapse between the instant of activation for triggering a starting signal and the eventual start of the operating cycle are varied. At the maximum feasible working speed this total time is selected to be equal to and not shorter than the fixed response time that is characteristic of the machine. As will be understood from the explanations that follow it is desirable even at the maximum feasible working speed still to provide a total time that exceeds the response time of the machine. Since the total time will therefore exceed the response time of the machine at any practicable working speed, the method according to the invention proposes to interpose a time lapse between the instant of activation and the triggering signal. The duration of this time lapse depends upon the working speed. This time lapse can be interposed without any break in machine operation. Since activation always takes place in the same machine position, irrespectively of the working speed, the necessary switch-operating cams or the like need not be reset. Moreover, the provision of multiple cams is unnecessary. The interposition of the correct time lapse can also be effected when the machine speed eliminates the aforedescribed drawbacks of conventional methods of control.

In a preferred mode of performing the proposed method the interposed time comprises a measuring time and possibly a delay time for delaying the triggering of the operating cycle, and the magnitude of the working speed as well as the magnitude of the required delay are measured during the measuring time.

Measuring and control means which preferably operate electrically are thus capable of triggering the operating cycle at the correct instant with great precision, irrespectively of the working speed, so that after the expiration of the fixed time determined by the machine time constant, the starting position of the moving machine element at which the operating cycle is to begin will just be attained.

In accordance with a further feature of the method of my invention, the measuring time follows the delay time and, during each measuring time, the delay time that applies to the following operating cycle is measurable.

This procedure is advantageous in that it is possible, if desired, to make use of negative delays, in which case the determination of the activating position is not based upon the maximum feasible working speed, but rather upon an average working speed or even upon the slowest expected working speed.

In accordance with another feature of my inventive methods, the measuring time precedes the delay time, and the delay time applying to the immediate operating cycle is determined during the measuring time.

This procedure has special advantages if, as is hereinafter described, the time is measured by counting pulses.

Incidentally, the measuring time and the delay time may in principle not be directly consecutive. The delay time may be subdivided into a plurality of fractional periods with intervening interruptions. For instance, the method may be based on a fundamental delay time followed by the measuring time and the remainder of the delay time. The measuring time could also be divided into several time intervals. This is of importance when it is initially desired only to perform a rough measurement that is to be corrected later by a more precise measurement.

In accordance with a particularly simple and advantageous additional feature of the method of my invention, the measuring time is a fixed time used for all working speeds.

This is particularly convenient, as will be later described, when the time is measured by pulse counts.

In accordance with a preferred mode of the method of my invention, I determine the activating position of the moving machine element when the machine is started up, so that, at the highest feasible working speed, the delay is zero and the interposed time equals the fixed measuring time, whereas the total time, referred to as the overall time constant, is equal to the sum of the fixed measuring time and the fixed response time of the machine.

According to a further mode of my inventive method, the delay time at the selected working speed is determined by multiplying the overall time constant with the ratio of the maximum feasible working speed to the actual working speed, minus one.

Furthermore, according to my invention, the existing working speed is measured and the magnitude of the required delay time determined by the generation and counting of pulses having a pulse repetition frequency proportional to the working speed.

In such a case, in accordance with an added feature of the invention, the pulses are generated in synchronism with the rotation of the machine shaft and applied to a counter which, in the activating position of the moving machine element, begins the count and, upon reaching a prescribed total count, referred to as triggering pulse number, causes the operating cycle to be triggered.

Moreover, the method of my invention also comprises selecting the triggering pulse number by first choosing a technically convenient maximum pulse repetition frequency at the maximum feasible working speed and by then determining the triggering pulse number as being that number of pulses which is counted during the fixed measuring time at this maximum pulse repetition frequency.

In accordance with a convenient additional feature of my invention, the triggering pulse number which is thus determined is used as a fixed pulse number for all working speeds.

According to other features of the method of the invention, at the selected actual working speed, I count during the fixed measuring time, the pulses that are generated at a first pulse repetition frequency which bears the same proportion to the maximum pulse repetition frequency as the actual working speed to the maximum feasible working speed, and I continue the count using the pulses generated at a second pulse repetition frequency which bears the same proportion to the first pulse repetition frequency as the fixed measuring time to the overall constant, the pulse count of this second pulse repetition frequency being continued until the fixed triggering pulse number has been reached and the triggering signal is released.

In studies upon which the present invention is based, it was found that this very simple method of pulses counting automatically results in a correct control of the operating events at the correct times and in the correct positions of the moving machine element, even when the working speed during operation is continuously varied. In this mode of the method of my invention, the fixed measuring time directly precedes the delay time. The change-over from the first pulse repetition frequency to the second pulse repetition frequency at the end of the fixed measuring time and at the beginning of the delay time may take place within a negligibly short time.

In the afore-mentioned alternative mode of the method of my invention wherein the measuring time follows the delay time, the pulse counting procedure can be analogously employed.

The control system for performing the method according to the invention relates to the control of a machine tool operating at varying speeds, particularly of a draw machine of the reciprocating carriage type, which starts an operating cycle each time a moving machine element reaches a given starting position which is the same at all working speeds of the machine, the operating cycle having been triggered at a time preceding the start of the operating cycle by a fixed time interval which is the same at all working speeds and is a characteristic of the machine (machine time constant).

According to the invention, I provide such control system comprising a pulse generator having a perforated disc, gear-wheel, group of discs or the like, which is used for every working speed, and which revolves in synchronism with the machine shaft, the disc, gearwheel or the like having two banks or arrays of holes or gear teeth, of which the first array serves for generating pulses at a first pulse repetition frequency during the fixed measuring time, whereas the second array serves for generating a second pulse repetition frequency at the end of the fixed measuring time, the first array comprising a number of holes or teeth which at the maximum feasible working speed and at the maximum pulse repetition frequency generates the fixed triggering pulse number during the fixed measuring time, whereas the number of holes or teeth in the second array bears the same ratio to the number of holes or teeth in the first array as the fixed measuring time to the overall time constant.

One specific embodiment of the control system of my invention, is intended specifically for a draw machine of the reciprocating draw carriage type wherein the gripping periods are controlled by two switch rings mounted on the mainshaft. This control system comprises a switch associated with each ring and adapted, in a given position of the associated ring (activating position) to apply the first of the two continuously generated pulse repetition frequencies to a counter, by a time switch which serves, at the end of a fixed measuring time, to switch over the counter to the second pulse repetition frequency, and by a form of construction of the counter which causes the same to energize (trigger signal) an electromagnetic valve for closing the jaws of the associated draw carriage when the count reaches the fixed trigger pulse number.

In accordance with another feature of the control system of my invention, the counter is so contrived that in the off-position of the associated switch ring, the fixed triggering pulse number counted by the counter is changeable back to zero in preparation for the next count which begins in the on-position of the other switch ring, the switch associated with the latter ring applying the first pulse repetition frequency (generated by the same pulse generator) to the counter and the ensuing count proceding analogously to the preceding count.

Furthermore, in accordance with the invention, the control system comprises an associated set of perforated discs, gear wheels or the like having different ratios of the number of holes or teeth in the arrays of holes or teeth, respectively, formed therein, for use in different machines having different fixed machine response times (machine time constants).

According to yet another feature of my invention, I provide a control system which comprises setting means for setting the fixed measuring time and the fixed triggering pulse number in such manner that, in different machines having different response times (machine time constants), the ratio of the fixed measuring time to the overall time constant is still the same, and as determined by the ratio of the number of holes or teeth in the banks or arrays thereof in the single perforated disc, gearwheel or the like, that is used.

Other features which are considered as characteristic for the invention are set forth in the appended claims.

Although the invention is illustrated and described herein as embodied in method of controlling a machine tool operated at different working speeds and control system for performing the method, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, in which.

Figure 1:
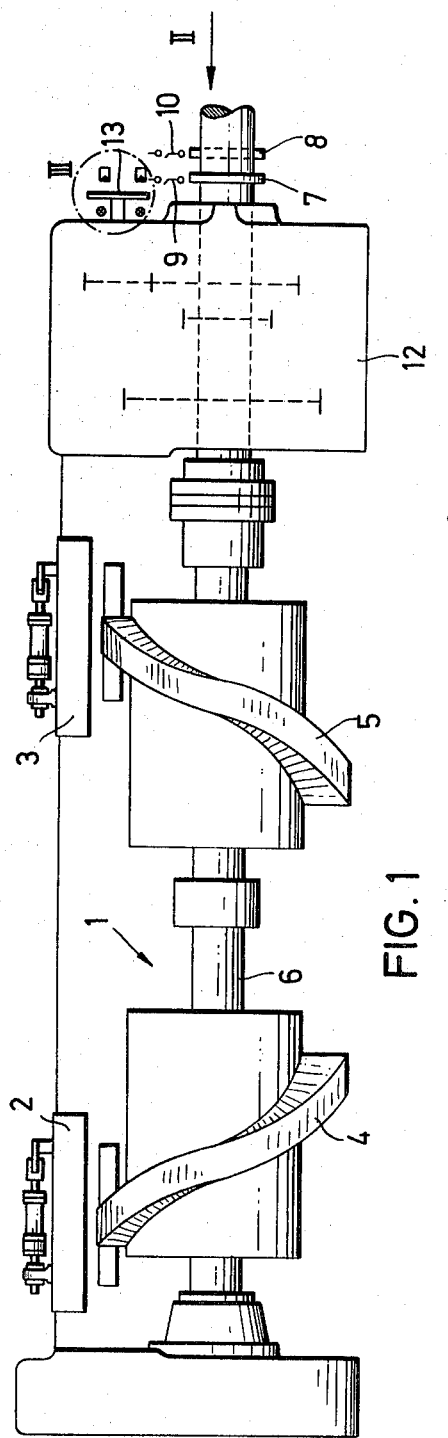
FIG. 1 is a schematic side elevational view of a draw machine including two draw carriages and parts of the control system according to my invention.
Figure 2:
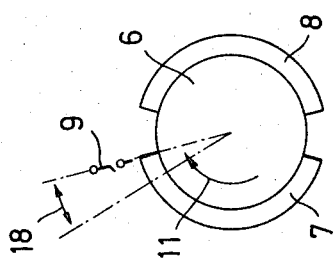
FIG. 2 is an enlarged fragmentary view of the switch rings of FIG. 1 as seen in the direction of the arrow II in FIG. 1.

Referring now to the drawings, and first particularly to FIG. 1 thereof, there is shown a draw machine 1 which includes two draw carriages 2 and 3 reciprocated by cams 4 and 5, that revolve together with a mainshaft 6. The mainshaft 6 also carries switch rings 7 and 8 which cooperate with switches 9 and 10. In particular angular positions of the rings 7 and 8, the one or the other switch 9 and 10 is closed. FIG. 2 shows the switch 9 in the course of a revolution of the mainshaft 6 in the direction of an arrow 11 at the instant it is being closed by the ring 7. This switch 9 then remains closed until it is again released by the switch ring 7. The other switch 10 cooperates with the second ring 8 in an analogous manner. The alternate actuation of the switches repeats itself in a repetitive cycle. One cooperative pair of the switches and rings is associated with one of the draw carriages and the other pair with the other draw carriage.

In the position shown in FIG. 2, the closing of the switch 9 by the ring 7 marks the beginning of the fixed measuring time. The correct position of the ring 7 in relation to the switch 9 has been previously determined at the maximum working speed of the machine, as has already been described hereinabove in detail.

Mounted on the gear box 12 of the draw machine is a perforated disc 13 which revolves synchronously with the mainshaft 6. The perforated disc 13 is formed with two coaxially disposed circular arrays of holes 14 and 15. The radially outer circular array of holes 14 comprises a larger number of holes than the radially inner circular array of holes 15. The outer circle of holes 14 serves for the generation of a first pulse repetition frequency, these pulses being counted during the fixed measuring time. The inner circle of holes 15 generates a second pulse repetition frequency which bears the same ratio to the first pulse repetition frequency as the fixed measuring time to the overall machine constant, these latter pulses being counted from the end of the fixed measuring time and continued until the fixed triggering pulse number has been reached and the operating cycle is triggered.

The pulses themselves are generated by the cooperation of photoelectric cells 16', 16'' and 17', 17'' with the holes.

The delay time begins at the end of the fixed measuring time, and the trigger signal is given at the end of the delay time. The time lapse between the trigger signal and the start of the operating cycle (starting position) is the fixed response time of the machine. The beginning of the operating cycle in the contemplated example is determined by the instant the jaws on the draw carriage have closed, firmly gripped the work and applied the pulling forces to the work. During these events, the mainshaft 6 will have continued to turn through a given angle. This total angle between the activating switch position and the starting position is the same irrespective of the working speed. The switch ring has turned through a corresponding total angular distance 18. This total angle is equal to the total angle of rotation of the mainshaft 6 if the switch rings are mounted on the mainshaft itself and are not driven through interposed gearing. Since the different moving parts of the machine move in synchronism, the starting position in which the operating cycle is to begin need not be related to the position of the mainshaft or of the carriages but can be referred to that of the switch rings, even if these are rotated through gearing. Similarly, the activating switch position may be referred to and defined as a particular angular position of the switch rings. Although the total angle between the activating switch position and the starting position is always the same, irrespective of working speed, the subdivision of this angle into component angles representing fixed measuring time, delay time and response time of the machine differs according to the working speed. The advantage of the method of my invention, particularly when using a pulse count, also resides in that this subdivision which differs according to working speed is controlled automatically so that the same position of activation always causes the jaws to close on the work in the correct starting positions, thereby ensuring that by the cooperation of the two draw carriages, as in the illustrated example, the work will be automatically and correctly drawn through the die continuously at any working speed.

Figure 4:
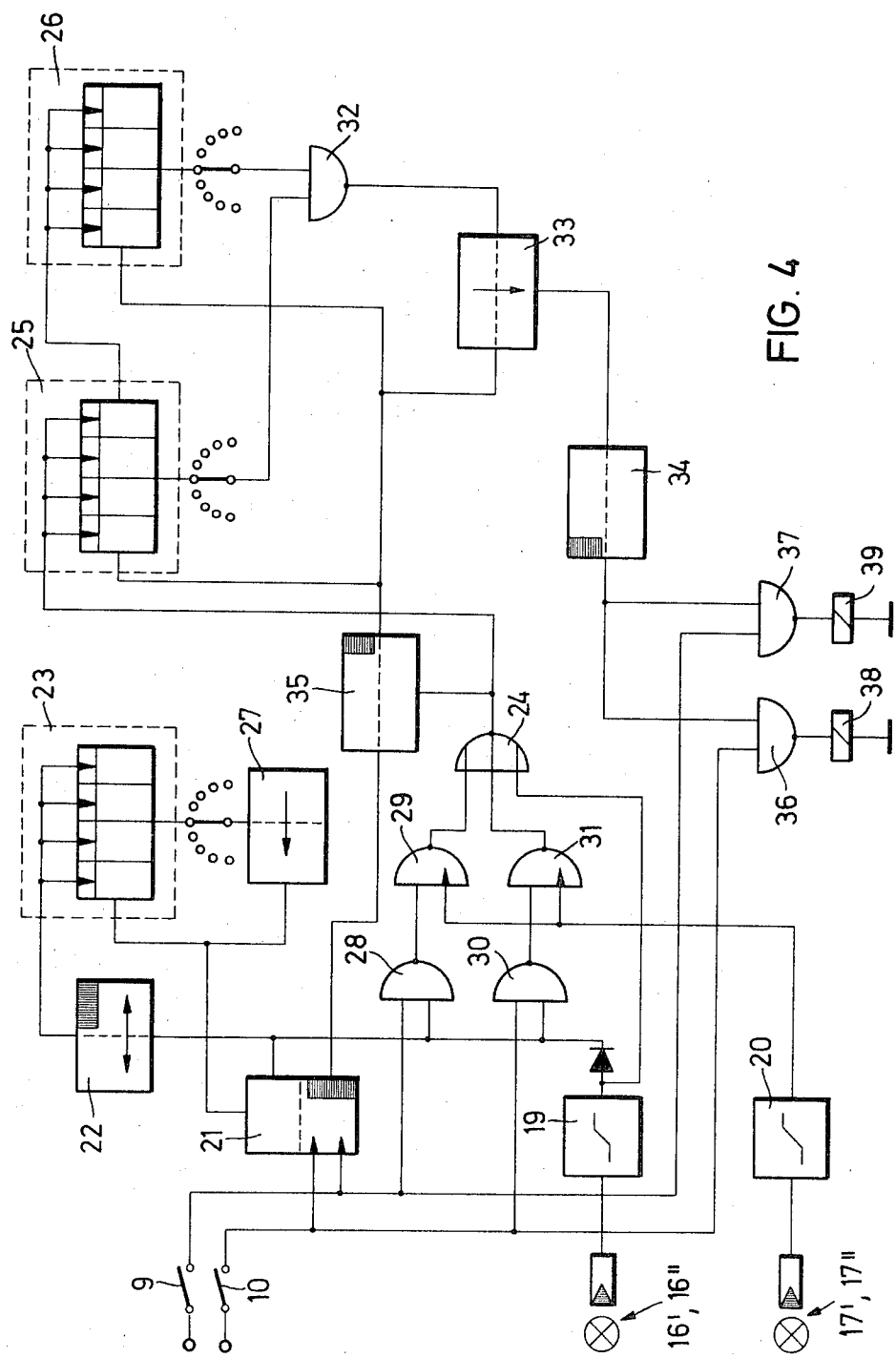
FIG. 4 is a circuit diagram of the control system of my invention.

The manner in which the proposed control system functions will be hereinafter more particularly described with reference to the circuit diagram in FIG. 4.

Figure 3:
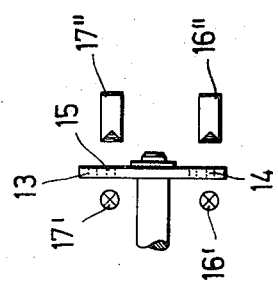
FIG. 3 is an enlarged fragmentary view of part of FIG. 1 enclosed by the circle III therein and showing the disposition of the perforated disc.

When the machine has been started up the photoelectric cells 16', 16'' and 17', 17'' continuously generate pulses according to the speed of the machine in synchronism with the rotation of the perforated disc 13 (FIGS. 1 and 3). These pulses are converted by shaping circuits 19 and 20 into square wave pulses. However, owing to the interposition of combinational functions these are not directly applied to the counter. When the switch 9 or 10 is closed by the switch ring 7 or 8 (activation) a bistable stage 21 is set and activates an astable stage 22 which generates pulses (time measurement) at a repetition frequency of 100 c/s. These pulses are applied to a counter 23 which functions as a time switch. During the period of the count (fixed measuring time) the pulses from the photoelectric cells 16', 16'' pass through the pulse shaping circuit 19 and a NOR gate 24 into a counter comprising decimal stages 25 and 26. When the counter 23 has counted the predetermined number of pulses corresponding to the fixed measuring time, say five pulses for a fixed measuring time of 50 ms, a pulse is sent from stage 21 to the monostable stage 27 which resets stage 21 and zeroizes the timing counter 23 while simultaneously providing a path for the pulses from the photoelectric cells 17', 17'' to the decimal counters 25 and 26. The trigger signal, in the case of switch 9, is transmitted through the logic elements 28 and 29 and in the case of switch 10, through the logic elements 30 and 31. When the counter 25, 26 reaches the preset fixed number of pulses an AND gate 32 activates the monostable stage 33 which sets the bistable stages 34 and 35. Through gate 36 for switch 9 and gate 37 for switch 10, the corresponding electromagnetic valve 38 or 39 is exciting (trigger signal) and the associated draw carriage begins to take over. At the end of the fixed response time of the machine (machine constant) the jaws have gripped and the starting position is attained. The jaws maintain their grip until the switch ring releases the switch. The counter 25, 26 is zeroized by stage 33 and stage 35 prevents the continuation of the count. When the switch 10 is operated, the stages 21 and 35 are set and a fresh cycle can begin.

The two following examples describe the manner in which the proposed control system should be calculated and designed.

EXAMPLE 1

The machine tool is assumed to be a reciprocating carriage type draw machine according to FIG. 1. At the highest feasible working speed the mainshaft 6 of this machine performs 60 r.p.m. A maximum pulse frequency of 600 c/s may be chosen as technically convenient to handle for counting purposes. The gearing 12 driven by the mainshaft 6 is assumed to have a transmission ratio of 3.75 : 1. At the highest practicable working speed the perforated disc 13 will then rotate at a speed of $3.75 \cdot 60 = 225$ r.p.m. For the generation of 600 c/s the number of holes required in the circle 14 is therefore $600/3.75 = 160$.

The fixed response time (machine constant) was found to be 130 ms (milliseconds). The fixed measuring time was chosen to be 50 ms. The fixed number of pulses required for triggering must therefore be $600 \cdot 50 \cdot 10^{-3} = 30$. The total fixed time is therefore $130 + 50 = 180$ ms. The number of holes 15 in circle 15 is obtained from this as $160 \cdot (50/180) = 44.4$, or 44 taken to the nearest integer.

The delay time is the overall time constant (180 ms) multiplied by the ratio of the maximum permissible working speed to the actual working speed minus one. Instead of the ratio of the working speeds the ratio of the speeds of revolution of the mainshaft 6 can be taken, since this is naturally the same. In the contemplated example the delay time will therefore be $$180 \left(\frac{60}{n}-1\right) \text{ ms.}$$

60 being the highest feasible speed and $n$ the actual speed of the mainshaft 6 in r.p.m. If $n = 60$ r.p.m., i.e., equal to the maximum speed, then the delay time will be zero and the trigger signal will appear at the end of the fixed measuring time (50 ms). At lower speeds $n$ there will be a corresponding delay between the end of the fixed measuring time and the appearance of the trigger signal. In both cases there will be a further time lapse between the trigger signal and attainment of the starting position, this time lapse being the response time of the machine (machine constant = 130 ms).

Example for the calculation of the delay time:
Speed $n = 40$ r.p.m.

$$\text{Delay time} = 180\left(\frac{60}{40}-1\right) = 90 \text{ ms.}$$

Comparison with the pulse count:
The pulse frequency generated by the circle of holes 14 is 400 c/s and that of the circle of holes 15 is $400 \cdot (44/160) = 110$ c/s. In 50 ms (fixed measuring time) 400 c/s provides 20 pulses. Hence 10 more pulses are necessary to make up 30. At 110 c/s these require another 91 ms. This is within the tolerance limit. Incidentally the minor difference is due to 44.4 holes having been rounded off to the nearest integer 44.

EXAMPLE 2

Let the machine tool which is otherwise identical with that described above have a machine time constant of 208 ms. The same perforated disc containing 160 and 44 holes is to be used. In such a case a new fixed measuring time must be calculated from the formula $$160 \cdot \frac{\text{fixed measuring time}}{208 + \text{fixed measuring time}} = 44$$

This equation is satisfied by a fixed measuring time of 79 ms and a new total fixed time of 287 ms. The number of fixed pulses must also be changed to $600 \cdot 79 \cdot 10^{-3} = 47.5$ or, rounded off, the fixed pulse number = 48.

It will be seen that the change of the fixed measuring time and of the fixed pulse number permits the same perforated disc to be used even when the machine time constant is different each time.

I claim:

1. In a machine which can be operable at different working speeds and in which each working cycle starts when a moving machine element is in a particular starting position and the instant of triggering of the starting precedes the instant of starting by a constant time interval characteristic of the machine, the method of operation which comprises the steps of firstly initiating the triggering action by an activating operation performed when the moving machine element is in an approach position a fixed distance ahead of its starting position and so chosen that the total time required by the moving element to traverse this fixed distance, even at maximum feasible working speed, is not less than said constant time interval, and interposing between the instants of activation and triggering a variable time that depends upon the working speed and that equals the difference between the variable total time and the constant time interval.

2. A method as claimed in claim 1, wherein the interposed time interval comprises a measuring time, and the magnitude of the working speed is measured during the measuring time.

3. A method as claimed in claim 2, wherein the interposed time interval additionally comprises a delay time for delaying the triggering of the operating cycle, and the magnitude of the working speed and of the required delay are measured during the measuring time.

4. A method as claimed in claim 3, wherein the measuring time follows the delay time, and during each measuring time the delay time applying to the following operating cycle is measured.

5. A method as claimed in claim 3, wherein the measuring time precedes the delay time and during each measuring time the delay time applying to the same operating cycle is measured.

6. A method as claimed in claim 1, wherein the measuring time is a fixed measuring time that applies to all working speeds.

7. A method as claimed in claim 6, wherein the activating position of the moving machine element when the machine is started up is so determined that at the highest feasible working speed the delay is zero and the interposed time equals the fixed measuring time whereas the total time referred to as the overall time constant is equal to the sum of the fixed measuring time and the fixed time interval characteristic of the machine.

8. A method as claimed in claim 7, wherein at a selected working speed, the delay time is determined by multiplying the overall constant by the ratio of the maximum feasible working speed to the actual working speed minus one.

9. A method as claimed in claim 4, wherein the existing working speed is measured and the magnitude of the required delay time is determined by the generation and counting of pulses having a pulse frequency proportional to the working speed.

10. A method as claimed in claim 9, wherein the pulses are generated in synchronism with the rotation of the machine shaft and are applied to a counter which in the activating position of the moving machine element begins the count, and which upon reaching a prescribed total count referred to as the triggering pulse number causes the operating cycle to be triggered.

11. A method as claimed in claim 10, wherein the triggering pulse number is selected by first selecting a maximum pulse repetition frequency for the maximum feasible working speed and then determining the triggering pulse number as being that number of pulses which is generated during the fixed measuring time at this maximum pulse repetition frequency.

12. A method as claimed in claim 11, wherein the triggering pulse number is used as a fixed pulse number for all working speeds.

13. A method as claimed in claim 12, wherein at the actual working speed the pulses that are generated at a first pulse repetition frequency which bears the same proportion to the maximum pulse repetition frequency as the actual working speed to the maximum working speed are counted during the fixed measuring time, the count is then continued using pulses generated at a second pulse repetition frequency which bears the same proportion to the first pulse repetition frequency as the fixed measuring time to the overall constant, the pulse count at the second pulse repetition frequency continuing until the fixed triggering pulse number is reached.

14. A method as claimed in claim 13, wherein the machine is a draw machine of the reciprocating carriage type.

15. A control system for controlling a draw machine tool of the reciprocating carriage type driven at different working speeds, comprising a pulse generator having a rotatable element which is used for every working speed, and which revolves synchronously with a machine shaft, said rotatable element having two banks of strictures of which the first bank serves for generating pulses at a first pulse repetition frequency during a fixed measuring time and the second bank serves to generate a second pulse repetition frequency after the end of the fixed measuring time, the said first bank comprising a number of strictures which at the maximum feasible working speed and at the maximum pulse repetition frequency generate the fixed triggering number of pulses during the fixed measuring time, whereas the number of strictures in the said second bank bears the same ratio to the number of strictures in the said first bank as the fixed measuring time to the overall constant.

16. A control system as claimed in claim 15, wherein the rotatable element is at least one perforated disc, and said strictures are holes formed in said disc.

17. A control system as claimed in claim 15, wherein the rotatable element is a gear wheel, and said strictures are teeth formed on said gear wheel.

18. A control system as claimed in claim 15, for a draw machine of the reciprocating draw carriage type, wherein the gripping periods of the draw machine are controlled by two switch rings mounted on the main shaft of the machine comprising a switch associated with each switch ring and adapted, in a given activating position of the associated ring, to apply the first of the two continuously generated pulse repetition frequencies to a counter via a time switch cooperating with said counter and serving at the end of a fixed measuring time to switch over said counter to the second pulse repetition frequency, said counter being of such construction as to energize an electromagnetic valve for closing the jaws of the associated draw carriage when the count reaches the fixed triggering pulse number.

19. A control system as claimed in claim 18, wherein said counter is of such construction that in the OFF position of the associated switch ring the fixed triggering pulse number counted by the counter is changeable back to zero in preparation of the next count which begins in the ON position of the other switch ring, the switch associated with said other switch ring applying said first pulse repetition frequency to said counter and the ensuing count proceeding in a manner analogous to the preceding count.

20. A control system as claimed in claim 19, further comprising an associated set of rotatable elements for use on different machines having different fixed time interval characteristics, the sets of elements having ratios of strictures appropriate for the different machines.

21. A control system as claimed in claim 20, wherein said rotatable elements are perforated discs and said strictures are holes formed in said discs.

22. A control system as claimed in claim 20, wherein said rotatable elements are gear wheels and said strictures are teeth formed in said gear wheels.

23. A control system as claimed in claim 19, further comprising setting means for setting the fixed measuring time and the fixed triggering pulse number in such manner that in different machines having different fixed time intervals the ratio of the fixed measuring time to the overall fixed time interval can still be the same as determined by the ratio of the number of strictures in the rotatable element being used.

* * * * *